UNITED STATES PATENT OFFICE.

OLIN J. CAMPBELL AND JACOB B. BEAM, OF BIGRUN, PENNSYLVANIA; SAID BEAM ASSIGNOR TO SAID CAMPBELL.

COMPOSITION FOR REPAIRING BICYCLE-TIRES.

SPECIFICATION forming part of Letters Patent No. 690,903, dated January 7, 1902.

Application filed June 7, 1901. Serial No. 63,613. (No specimens.)

*To all whom it may concern:*

Be it known that we, OLIN J. CAMPBELL and JACOB B. BEAM, citizens of the United States, residing at Bigrun, in the county of Jefferson and State of Pennsylvania, have invented certain new and useful Improvements in Compositions for Repairing Bicycle-Tires, of which the following is a specification.

The object of our invention is to provide a composition of matter which may be employed in repairing porous or punctured bicycle-tires; but the composition may of course be used for repairing similar tires used on other vehicles.

The composition which we employ consists of gum-arabic, gray ocher, whiting, rye-flour, and lampblack. They are mixed together in powdered form in the following proportions: gum-arabic, one-fourth ounce; gray ocher, two ounces; whiting, two ounces; rye-flour, one ounce; lampblack, one-half ounce. This powdered mixture may be put up in packages, and it is applied to tires by mixing the composition with cold water to a consistency of cream. This may be applied by injecting it through the valve or the inflating-orifice of the tire. An ordinary bicycle-pump may be used for the purpose.

This composition does not injure rubber; but, on the contrary, it has been found that it will add strength and durability to the tires.

We claim as our invention—

The herein-described composition of matter, consisting of gum-arabic, gray ocher, whiting, rye-flour, and lampblack, in substantially the proportions specified.

In testimony whereof we have hereunto subscribed our names.

OLIN J. CAMPBELL.
JACOB B. BEAM.

Witnesses:
HENRY I. WILSON,
THOMAS C. MCQUOME.